United States Patent [19]
Kim et al.

[11] Patent Number: 5,809,099
[45] Date of Patent: Sep. 15, 1998

[54] LASER-GUIDED UNDERWATER WALL CLIMBING ROBOT FOR REACTOR PRESSURE VESSEL INSPECTION

[75] Inventors: Jae-Hee Kim; Heung-Seop Eom; Ko-Ryuh Kim; Jae-Cheol Lee; You-Rark Choi, all of Daejeon, Rep. of Korea

[73] Assignee: Korea Atomic Energy Research Institute, Daejeon-Si, Rep. of Korea

[21] Appl. No.: 851,274

[22] Filed: May 5, 1997

[51] Int. Cl.⁶ .................................................. G21C 17/013
[52] U.S. Cl. .............................. 376/249; 376/326; 901/1; 901/47; 250/559.33
[58] Field of Search ..................................... 376/249, 252, 376/258, 260, 326, 245; 901/1, 47, 46; 250/559.33; 356/375

[56] References Cited

U.S. PATENT DOCUMENTS 4,981,353  1/1991  Murakawa et al. ...................... 901/47

*Primary Examiner*—Daniel D. Wasil
*Attorney, Agent, or Firm*—Nikaido, Marmelstein, Murray & Oram, LLP

[57] ABSTRACT

An apparatus for inspection of a reactor pressure vessel uses a laser driven type underwater wall climbing robot guided by a laser pointer. The inspection apparatus uses a small and light underwater wall climbing robot for the quick and adequate inspection of weld lines of a reactor pressure vessel. Position control methods are provided for the stable guidance of the robot to desired three dimensional inspection positions on the reactor pressure vessel.

13 Claims, 9 Drawing Sheets

5,809,099

LASER-GUIDED UNDERWATER WALL CLIMBING ROBOT FOR REACTOR PRESSURE VESSEL INSPECTION

BACKGROUND OF THE INVENTION

1. Field of the Invention and Its Prior Art

The present invention relates to an inspection apparatus for a reactor pressure vessel and its positioning control methods, using an underwater wall climbing robot with magnetic wheels and a laser pointer in order to detect cracks in weld lines of reactor pressure vessels in pressurized water reactor (PWR) type nuclear power plants.

2. Description of the Related Art

An outline of a prior art apparatus for inspection of such vessels is shown, for example, in FIG. 9. Ultrasonic detection of a crack in a weld line of reactor pressure vessel 100 has been carried out by using fixed type manipulators 121 as shown. Ultrasonic inspection probe 112 is disposed on the finger-end of 121 manipulator. By moving probe 112 up and down on the weld area of reactor pressure vessel 100, ultrasonic inspection data is obtained. The inspection data is evaluated to identify cracks in the welds.

However, the inspection apparatus in this prior art is very heavy and very large, and therefore is complicated to transport, assemble for use, and disassemble after use.

SUMMARY OF THE INVENTION

It is therefore one object of the present invention to provide a small and light underwater wall climbing robot, which can quickly and adequately inspect PWR type reactor pressure vessels.

Another object of the present invention is to provide stable position control methods to guide the small and light underwater wall climbing robot to desired positions on a three dimensional inspection path on the wall of a reactor pressure vessel for an efficient and effective ultrasonic inspection.

In order to accomplish the above-described objects, the present invention consists of two main parts; an underwater wall climbing robot, and a laser beam pointer for guiding the robot. Being attached to the vertical wall of reactor vessel, the robot is equipped with ultrasonic sensors and is moved along given inspection paths, guided by a laser beam from the laser pointer.

In order to accomplish the above-described objects, the present invention provides a laser induced position control algorithm for the stable guidance of an underwater wall climbing robot to the desired three dimensional inspection positions on the wall of the reactor pressure vessel. The laser induced position control algorithm, shown below, is used by a position sensitive detector (PSD) on the underwater wall climbing robot in combination with the laser pointer on a pan-tilt device.

$$v_l = v_c + \dot{\phi}L$$
$$= K_{py}e_y + K_{dy}\dot{e}_y + K_{px}e_x + K_{dx}\dot{e}_x$$
$$v_r = v_c + \dot{\phi}L$$
$$= K_{py}e_y + K_{dy}\dot{e}_y - K_{px}e_x - K_{dx}\dot{e}_x$$

where, $v_l$, $v_r$: left/right wheel velocity, $v_c$, $\dot{\phi}$: linear and angular velocity of a robot center, $e_x$, $e_y$: position error to the direction of x, y axes, $K_{py}$, $K_{dy}$, $K_{px}$, $K_{dx}$: the gain of a corresponding controller.

BRIEF DESCRIPTION OF THE DRAWINGS

For a more complete understanding of the present invention, reference should be made to the appended drawings, wherein:

FIG. 3b is a side view of the underwater wall climbing robot's driving portion shown in FIG. 3a;

DETAILED DESCRIPTION OF THE PREFERRED EMBODIMENTS

Figure 2:
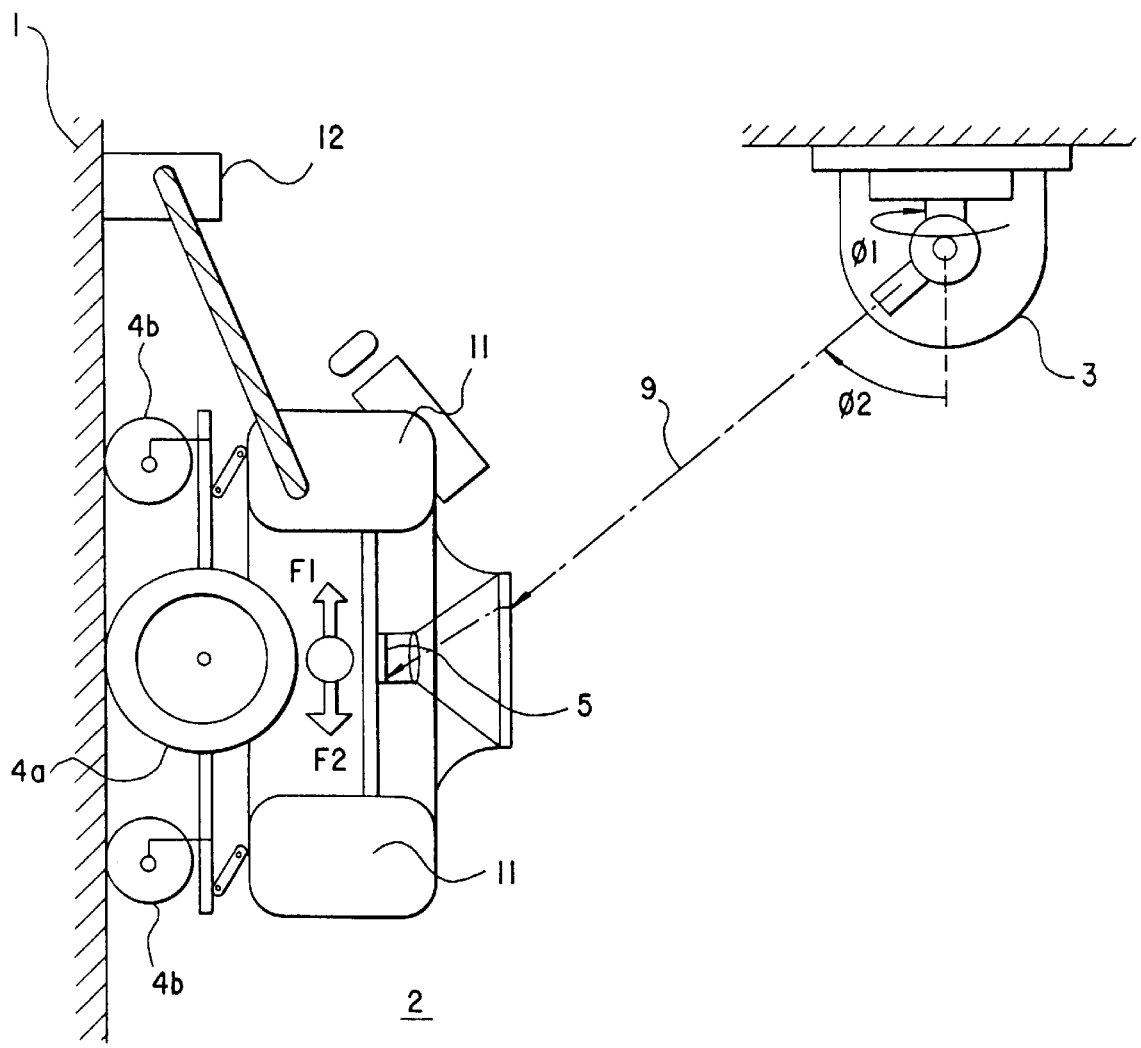
FIG. 2 is a more detailed illustration of an underwater wall climbing robot according to the invention.

An important aspect of the invention, shown, for example, in FIG. 2, is underwater wall climbing robot 2, which moves along the weld lines on the curved vertical wall of a reactor pressure vessel 1. Robot 2 is equipped with four magnetic wheels 4 in order to move on the curved vertical wall. Robot 2 is also equipped with position sensitive detector (PSD) 5 on the back thereof, to detect a laser beam from the laser beam pointer 3.

Underwater wall climbing robot 2 has a parallelogram type caster linker 16 (FIGS. 3a, 3b, 4a, 4b) which is specially designed to maintain the robot at a parallel position relative to the vertical wall of the reactor pressure vessel 1. Without parallelogram type caster linker 16, it can be difficult to control the position of underwater wall climbing robot 2 by laser beam only.

For the precise position identification, the underwater wall climbing robot 2 also uses two incremental encoders, inclinometer 23, and a pressure sensor, in addition to the position sensitive detector (PSD) 5.

The electronic control system of robot 2 is configured such that the laser beam spot is always on the center of the surface of PSD 5 when guiding or moving the underwater wall climbing robot 2.

The electronic control system of a laser beam pointer 3 is configured to handle laser beam pan-tilt device with a resolution of 0.01 degree.

Figure 1:
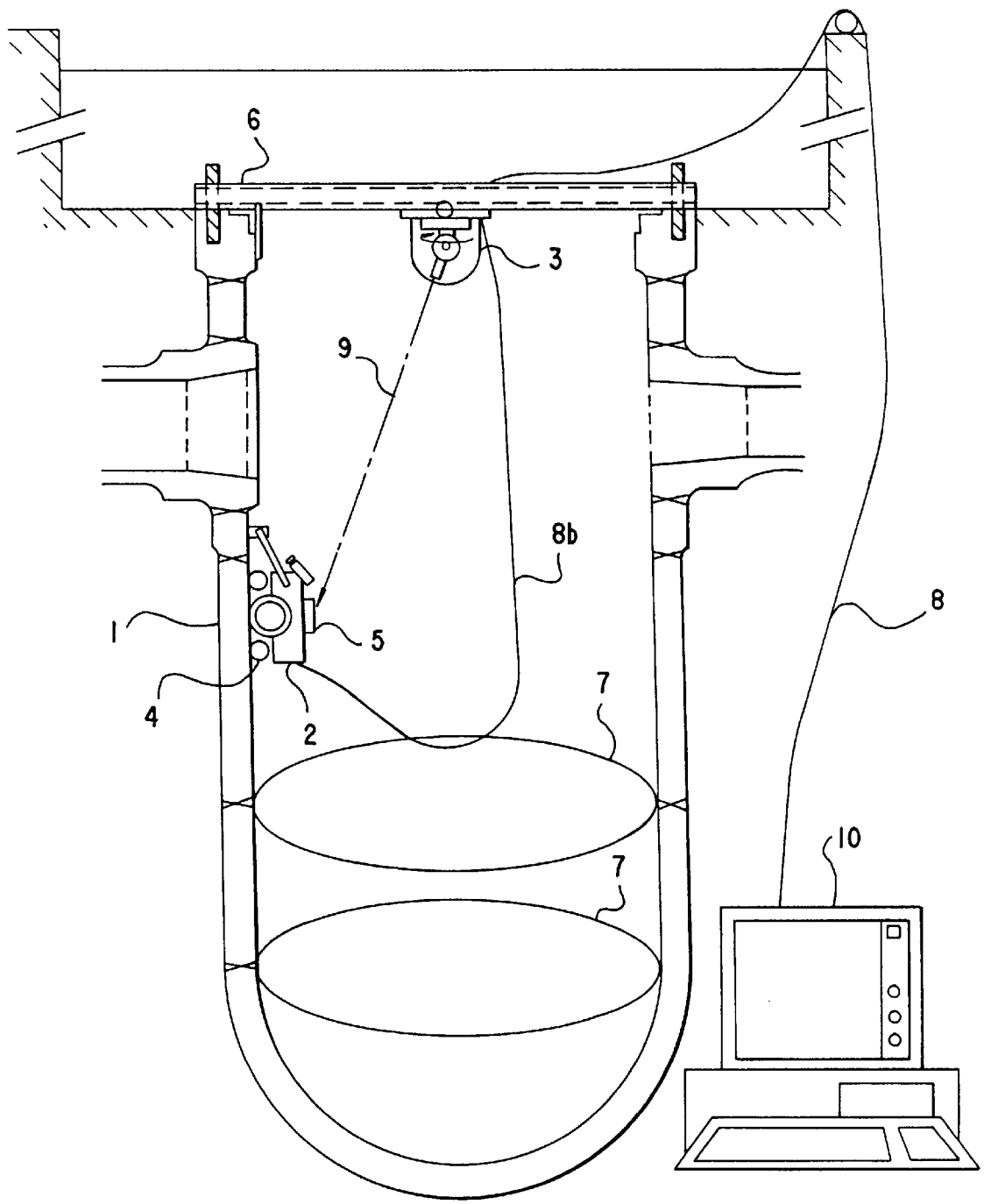
FIG. 1 is a schematic view showing a general embodiment of an underwater wall climbing robot on a reactor pressure vessel according to the invention.

A typical embodiment of the present invention is illustrated in FIG. 1. In the middle of cross-beam 6 in the upper side of reactor pressure vessel 1, the laser beam pointer 3 is placed. The main purpose of laser beam pointer 3 is, as noted above, to guide underwater wall climbing robot 2. Laser beam pointer 3 and main control computer 10 are electrically connected through cables 8. The commands to inspect weld lines 7 are generated by main computer 10. The cables 8 from main computer 10 are connected to underwater wall climbing robot 2, in order to supply electric power to the robot and to provide communication with each other. From the laser beam pointer 3, laser beam 9 is emitted into PSD 5 on underwater wall climbing robot 2. After underwater wall climbing robot 2 has recognized the arrival of laser beam 9 at any point on the surface of PSD 5, underwater wall climbing robot 2 moves such that the laser beam spot exactly coincides with the surface center of PSD 5. Consequently, underwater wall climbing robot 2 inspects the weld lines of reactor pressure vessel 1 with ultrasonic transducer 12, along the path or trajectory induced by the laser pointer 3, being attached to inner vertical wall of the reactor pressure vessel. As laser beam 9 moves, robot 2 moves to maintain the laser beam in the center of PSD 5.

FIG. 2 shows the close-up view of an underwater wall climbing robot 2. For ultrasonic inspection, underwater wall climbing robot 2 is equipped with ultrasonic transducer 12 on a finger end of the manipulator. In order to attach the robot body to the vessel wall 1, the robot has four magnetic wheels 4 with two wheels being driven wheels 4a and the other two wheels being caster wheels 4b. In order to reduce the robot weight under water, the robot is equipped with floats 11. Floats 11 are arranged so that the center of the buoyancy force F2 coincides with that of the gravitational force F1. With this consideration, the momentum sum of these two forces is zero, so the robot 2 is always provided with a stable posture under water.

Figure 3A:
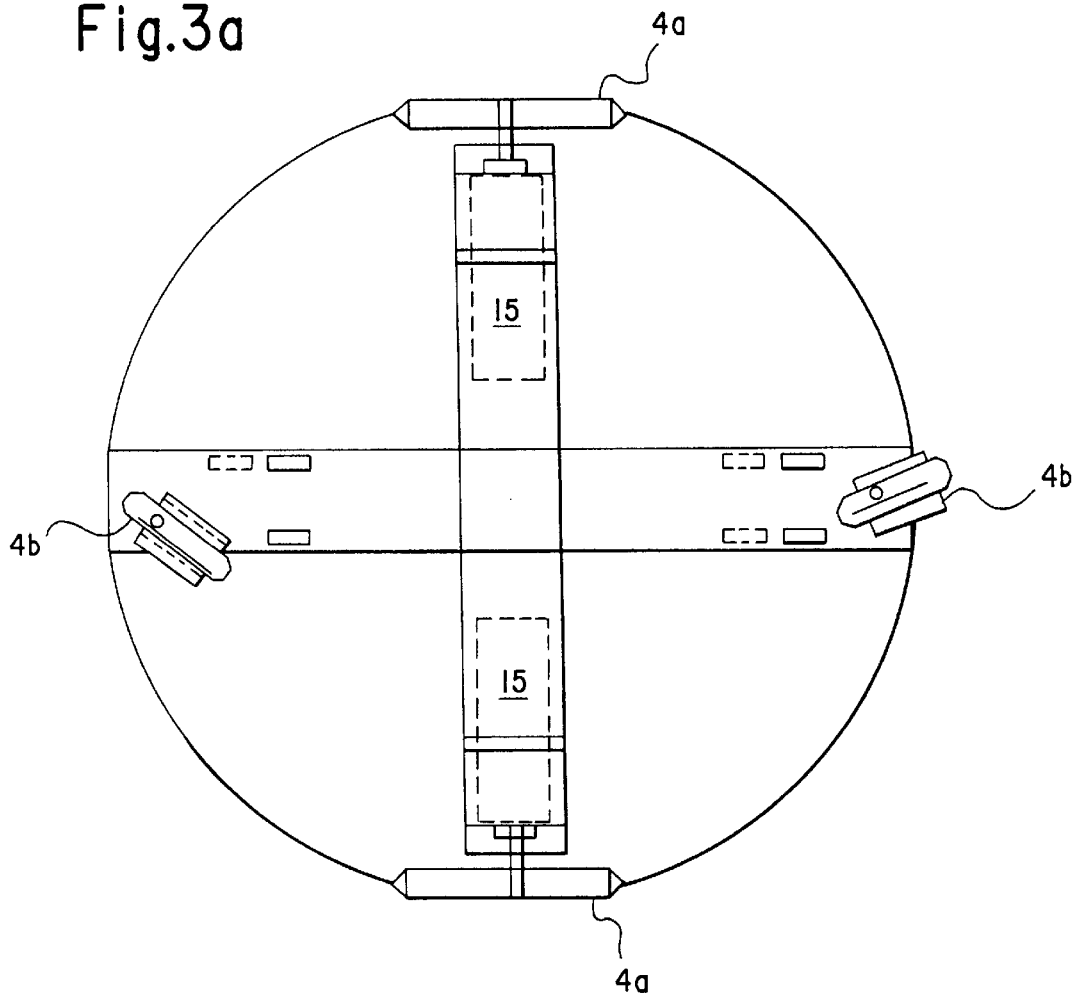
FIG. 3a is a top view of an underwater wall climbing robot's driving portion, showing the structure of parallelogram type caster link.
Figure 3B:
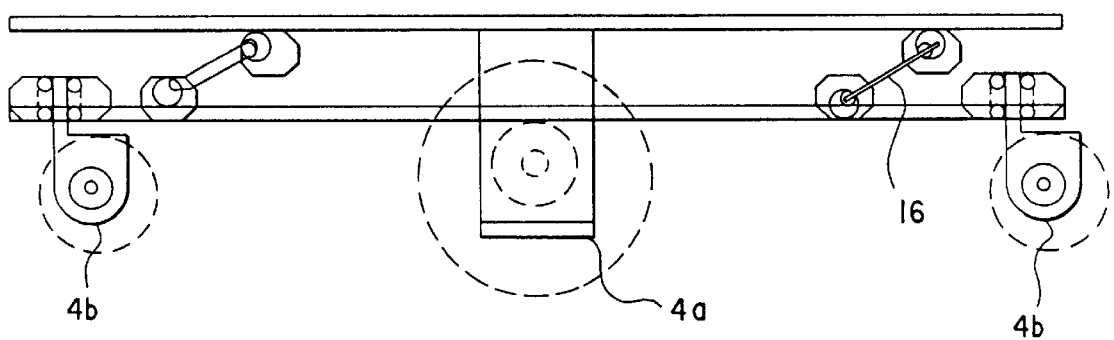

FIG. 3a shows the top view of the circle-like body of underwater wall climbing robot 2. The radius of the robot body is, as an example, 300 mm, and has the four magnetic wheels moved above; the right and left driven wheels 4a are controlled by DC servo motors 15, and the other two front and back caster wheels 4b support the robot body. Underwater wall climbing robot 2 moves by driving force from DC servo motor 15 to wheels 4a, which are designed to move the robot right or left and to accommodate to the caster linker 16 kinematically. It is to be noted that the driving apparatus is designed so that robot 2 can run on curved or cylindrical-shaped surfaces. Typically, however, conventional four wheeled mobile robots cannot run on curved surfaces smoothly, because one of the four wheels becomes separated from the curved wall. This problem made it impossible to accurately determine a position and velocity of the robot from encoder data. The present invention, however, avoids this situation by employing a novel parallelogram type caster link 16, which is linked to the robot body as shown in FIG. 3b. Using parallelogram type caster link 16, the robot body is always maintained in a parallel relationship to the curved surface and four magnetic wheels 4 are attached simultaneously on a curved surface.

Springs and dampers have previously been used to overcome the unevenness of a curved surface. However, robot 2 of the present invention has to run on an inspection area while attached to the wall of vertical vessel 1. If springs and dampers were to be used instead of magnetic wheels 4, the underwater mobile robot 2 would be undesirably affected by the spring restoring force in the direction opposite to the wall of vessel 1, making control thereof difficult.

Figure 4B:
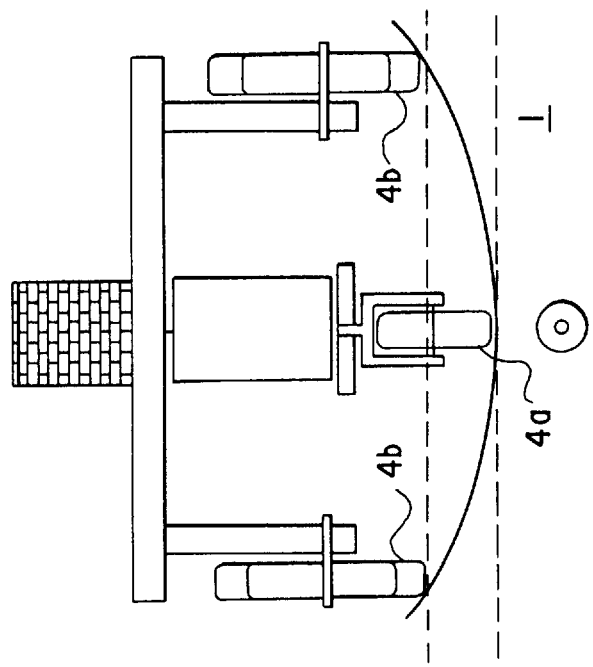
FIG. 4b is a top view of the caster link and wheels in motion on a curved wall.
Figure 4A:
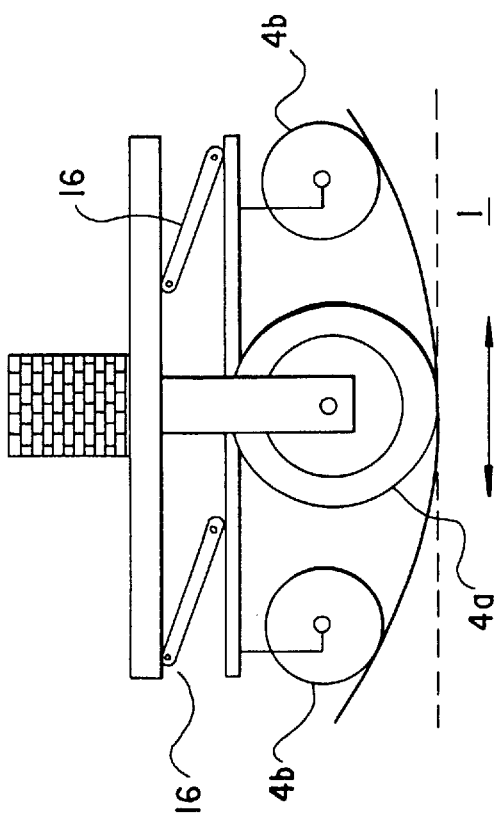
FIG. 4a is a side view of a caster link and wheels in motion on a curved wall.

FIGS. 4a and 4b show views of the wheels 4 and parallelogram links 16 supporting caster wheels, when robot 2 is moving on an inner vertical wall of the reactor pressure vessel 1.

FIG. 4b shows the robot moving vertically on the wall of vessel 1. In this situation, the positions of caster wheels 4b are lower than that of driven wheels 4a. If the radius of the reactor vessel is 4 m, and the width between two driven wheels 4a is 40 cm, then the position of caster wheels 4b is about 1 cm lower than that of driven wheels 4a.

FIG. 4a shows the robot moving circumferentially on the wall of vessel 1. In this situation, the positions of caster wheels 4b are about 1 cm higher than that of driven wheels 4a.

In the other situations, such as pivoting and oblique movements, the four wheels are stably attached to a surface by the same principle.

In order for a robot to run on a curved surface being attached to the vertical vessel 1 wall as discussed above, the robot must have strong adhesive power. Even if the inner surface of vessel 1 wall is clad with 4–6 mm stainless steel which is not magnetic, most materials are made of carbon steel which is a typical magnetic material. It is therefore possible to use a magnetic wheel 4 in order to obtain the needed adhesive power. Using magnetic force according to the invention, no additional components are required, so it is therefore possible to make the size of the apparatus smaller and its weight lighter.

Figure 5A:
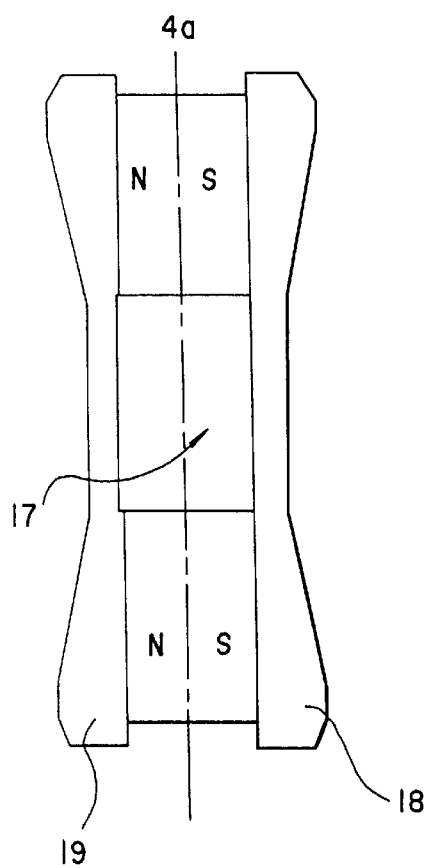
FIG. 5 is a view of magnetic wheels minimizing magnetic force loss.
Figure 5B:
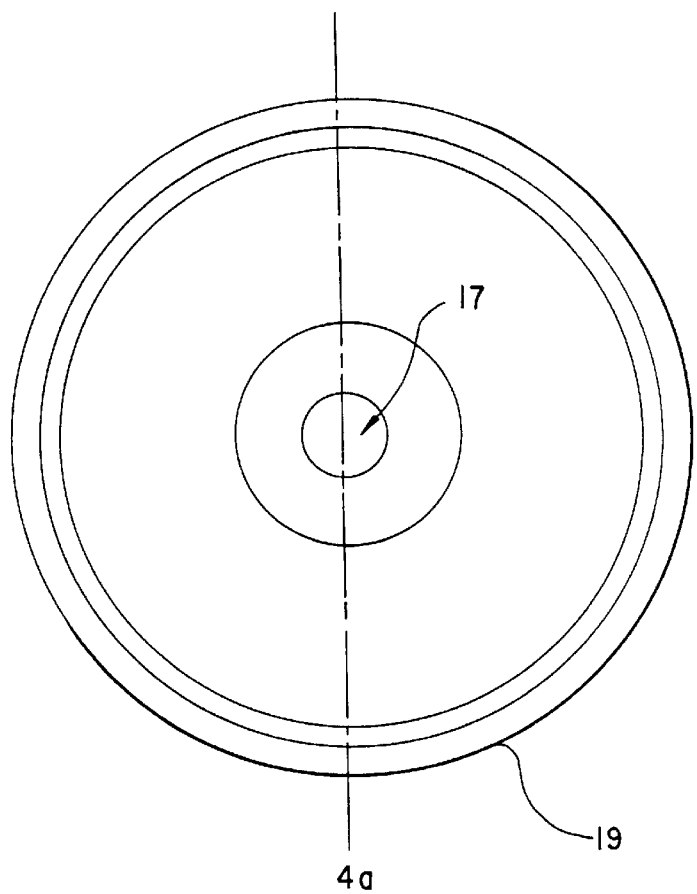

FIG. 5 illustrates one of magnetic wheels 4a in more detail. The magnetic wheel is made of neodymium (Nd), in a ring shape. As shown in FIG. 5, the N and S poles are magnetized on right and left surface of the magnet, and a pure steel plate is attached to both sides of the magnet to concentrate the magnetic force to the outer circle of wheels 4a.

On the other hand, magnetic wheels 4a can be covered by urethane rubber covers 19 to prevent wheel slipping. Intermediate shaft 17 is inserted into the bushing of magnetic wheels 4a to connect the shaft of motor 15, which is non magnetic material such as brass in order to isolate magnetic flux from magnetic wheel to motor shaft.

Figure 6:
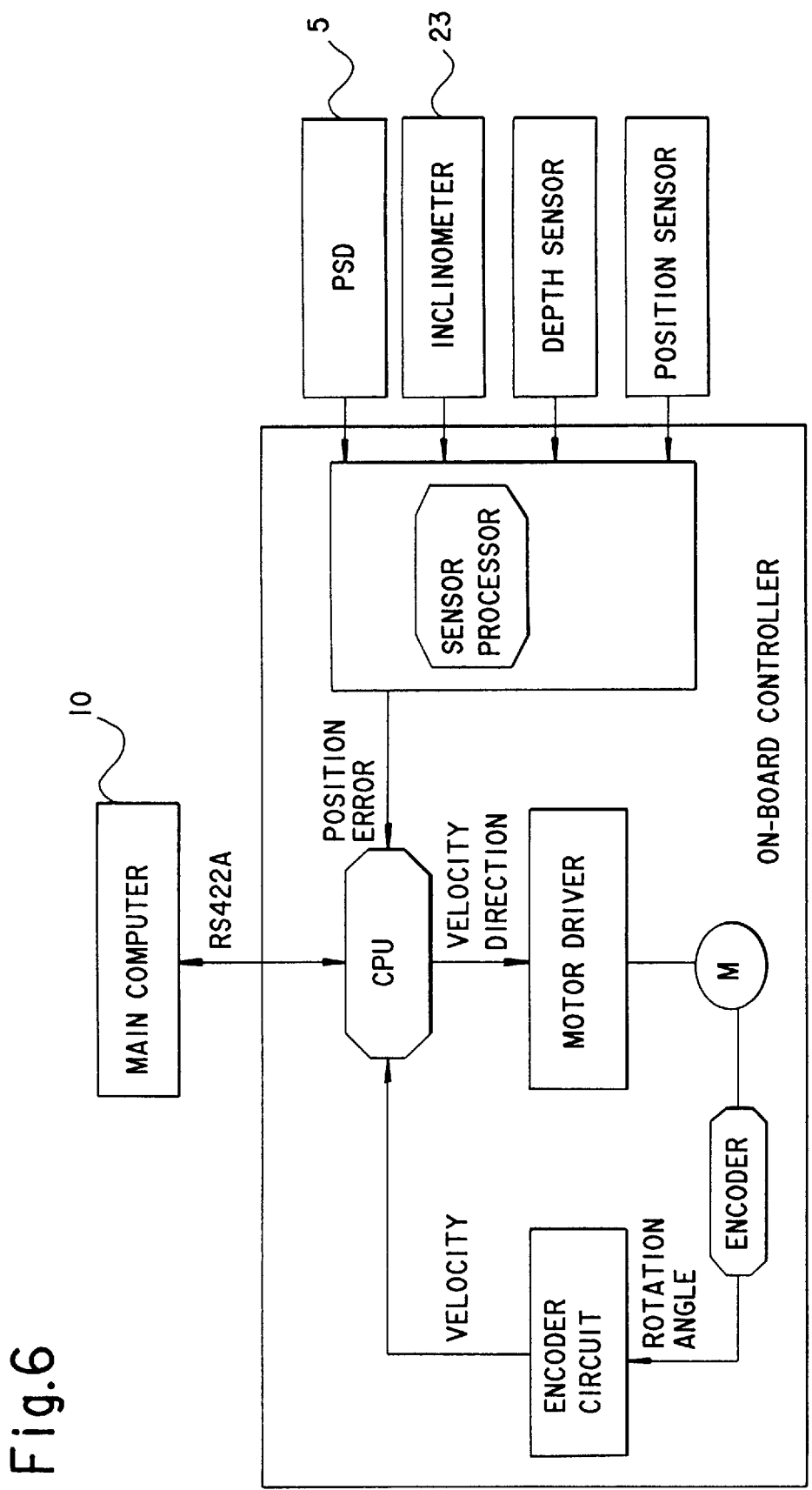
FIG. 6 is a schematic block diagram of the arrangement of a robot controller which includes a laser detecting circuit and of a motor driving circuit.

FIG. 6 shows a functional hardware block diagram of the robot controller. The instructions of robot controller are generated by the main computer 10. In order to properly control the underwater wall climbing robot 2, the robot controller uses several kinds of sensors; the sensors include the incremental encoder, PSD 5, inclinometer 23, and the depth sensor. A 16 bit updown counter detects the velocity and the rotation angle of the encoder.

For the other sensor signal, an analog sensor processor is used. The sensor processor changes the voltage level of the signal or converts the current signal to the voltage signal. The converted voltage signal is fed into the A/D converter in the robot CPU, and it then becomes a digital value.

An H-bridge type PWM driver is used to handle DC servo motors 15. Another kind of input signal is the signal from PSD 5, which generates the current signal which is proportional to the deviation of the laser beam 9 spot incident on the surface of PSD 5 from the center thereof. This current signal is also converted to the voltage signal by the analog sensor processor, and the converted signal is used by robot CPU to control robot 2.

Figure 7:
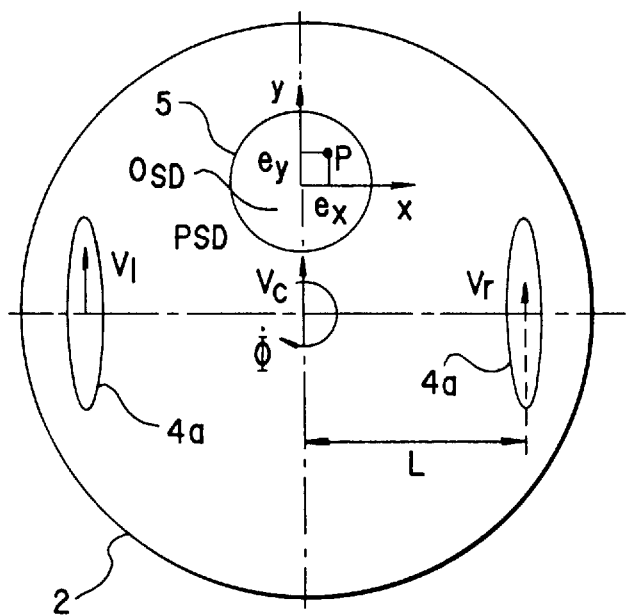
FIG. 7 is an illustration of the robot position control with laser beam information.

FIG. 7 illustrates the position control principle of robot 2. When laser beam 9 arrives at position P on the surface of PSD 5, PSD 5 generates the currents as explained in the above.

The variables $e_x$ and $e_y$ denote the x and y axis directional position errors of laser beam 9 spots from the center of PSD 5, respectively. Whenever the robot controller recognizes that the laser beam 9 has arrived on PSD 5, the controller attempts to set these position errors, $e_x$ and $e_y$, to be zero.

Based upon the fact that the linear velocity of the robot center, denoted by $v_c$, has the relationship with the y-directional deviation $e_y$, while the angular velocity of the robot center, $\phi$, is strongly related to the x-directional deviation $e_x$, we propose the following control law as $$v_c = K_{py} + K_{dy}\dot{e}_y$$

$$\phi = (K_{px}e_x + K_{dx}\dot{e}_x)/L$$

where $K_{py}$, $K_{dy}$, $K_{px}$ are the gains of the corresponding controller respectively and L is the distance between the robot center and the wheel. Also $\dot{e}_x$ and $\dot{e}_y$ at the time t are represented by $$\dot{e}_x(t) = (e_x(t) - e_x(t-T))/T$$

$$\dot{e}_y(t) = (e_y(t) - e_y(t-T))/T$$

where T is a sampling period for the position feedback. Finally, the linear and angular velocities of the robot are implemented to the two driving wheels 4. The velocity of the left wheels 4a, $v_l$ and that of the right wheels 4a, $v_r$, become $$\begin{aligned} v_l &= v_c + \dot{\phi}L \\ &= K_{py}e_y + K_{dy}\dot{e}_y + K_{px}e_x + K_{dx}\dot{e}_x \\ v_r &= v_c + \dot{\phi}L \\ &= K_{py}e_y + K_{dy}\dot{e}_y - K_{px}e_x - K_{dx}\dot{e}_x \end{aligned}$$

Figure 8:
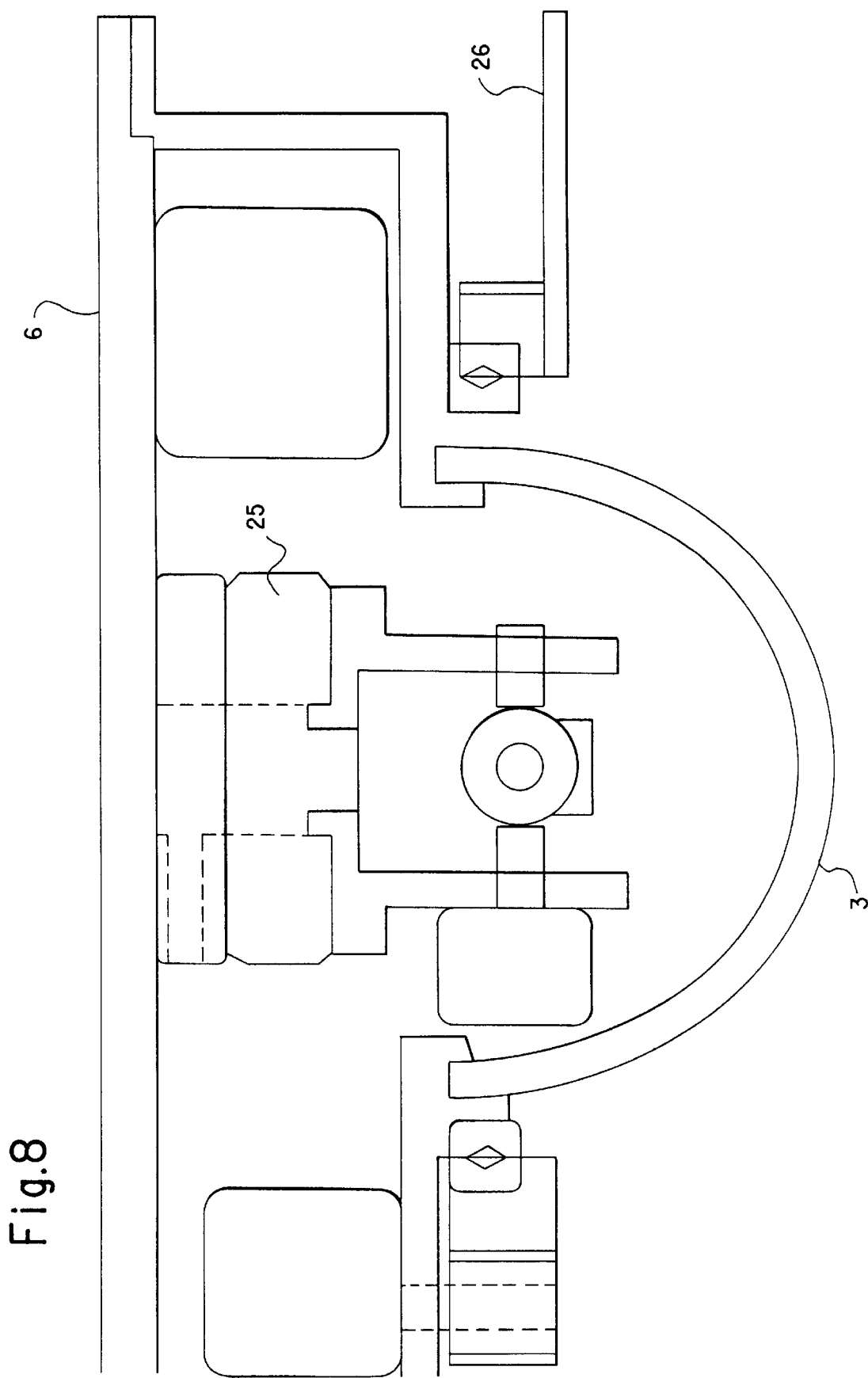
FIG. 8 is a drawing of a laser beam pointer, illustrating its structure.
Figure 9:
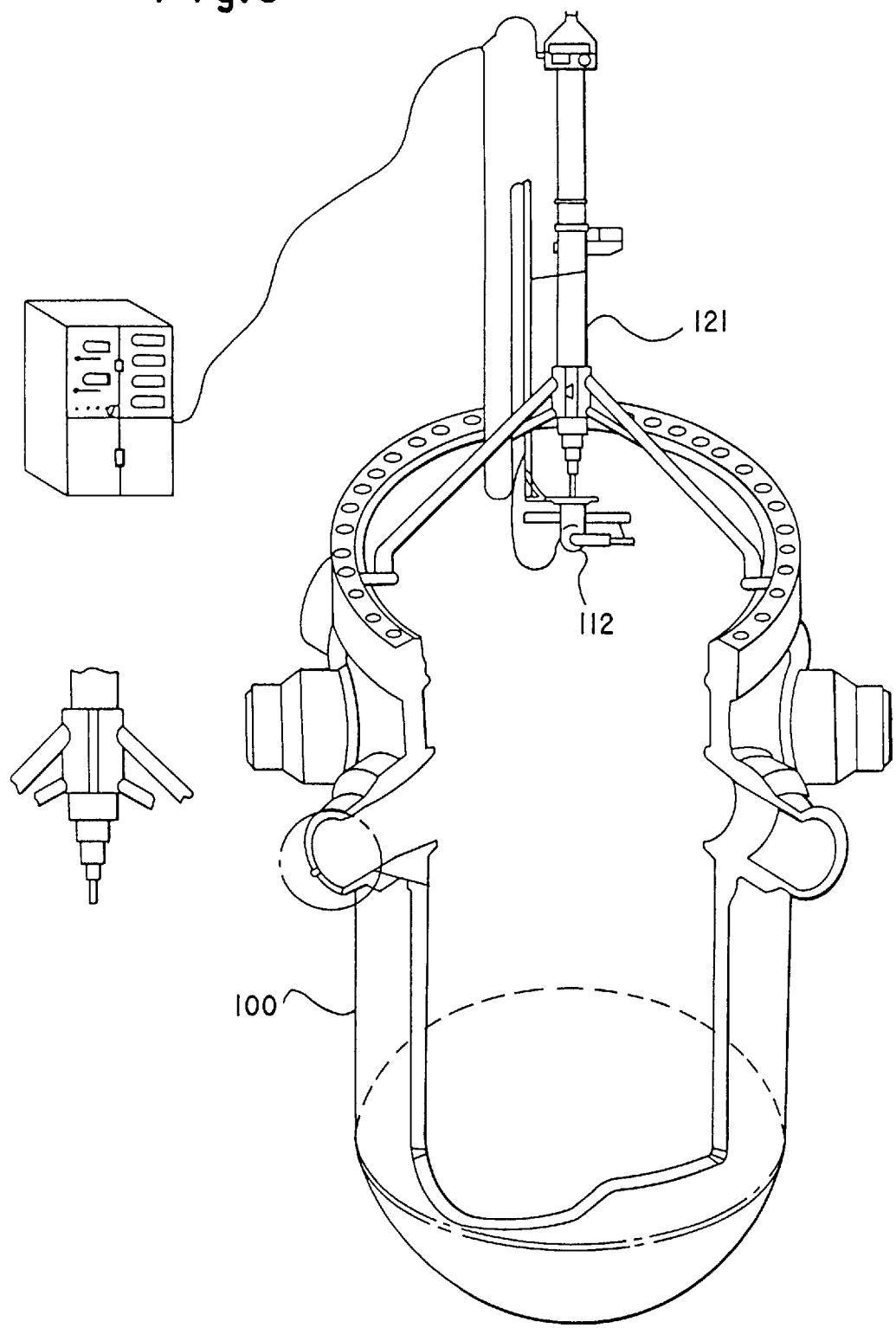
FIG. 9 is a schematic view showing an ultrasonic inspection system using a fixed type manipulator in the prior art.

FIG. 8 illustrates the structure of laser pointer 3.

The laser pointer 3 is a part of pan-tilt device 25 on which the laser diode is mounted. It has a rotation resolution of 0.01 degree, a panning range of 360 degrees, and tilting range of 180 degrees.

Cable handler 26 is provided in order to prevent cable 8b from obstructing or hiding laser beam 9 of FIG. 1. Cable handler 26 causes cable 8b to move in the opposite direction, away from the laser beam 9.

Underwater wall climbing robot 2 is instructed to move by the laser pointer 3 which is fixed in the middle of the cross beam 6, across the upper flange of the reactor pressure vessel. Laser point 3 emits the laser beam 9 to the position toward which the robot is to move next.

Since main computer 10 is provided with the geometric data of the reactor vessel 1, it can calculate the robot path, generate the pan and tilt angles of the laser pointer 3, and transfer them to the laser pointer 3. The laser pointer 3 controls pan-tilt device 25 along the paths with angular resolution which is less than 0.01 degree.

The invention operates as follows: The geometrical data of the reactor pressure vessel 1 is programmed or otherwise provided in the main computer 10, and main computer 10 generates the inspection path from this geometric data. Laser pointer 3, disposed in the middle of cross beam 6 across the reactor upper flange, communicates with main computer 10, and emits the laser beam so that underwater wall climbing robot 2 can follow the determined inspection path of the reactor pressure vessel 1.

At this time, the laser pointer 3 controls pan-tilt device 25 along the inspection path 1 with 0.01 degree angular resolution, in order to guide underwater wall climbing robot 2 along the weld lines 7. Using three dimensional position translation methods, the next position of the underwater wall climbing robot 2 is converted to the position of a laser beam spot position on the center of the surface of PSD 5.

After underwater wall climbing robot 2 has recognized the arrival of laser beam 9 at any point on the surface of PSD 5, underwater wall climbing robot 2 moves, if possible, so that the laser beam 9 spot exactly coincides with the center of the surface of PSD 5.

Consequently, underwater wall climbing robot 2 inspects the weld lines of reactor pressure vessel 1 with ultrasonic transducer 12, along the trajectory induced by the laser pointer 3, while the robot is attached to inner vertical wall of the vessel.

Compared to prior art fixed-type manipulators, the time required in inspection work using the present invention, as well as assembling and disassembling thereof, is relatively short. Therefore, it is possible to significantly reduce inspection costs, and improve the productivity of nuclear power plants by a reduction of the length at shutdown periods due to inspection.

Of course, it is evident that various changes and updates to the present invention would be possible, and still be with the confines of the invention. The spirit and scope of the present invention is therefore defined in the appended claims.

We claim:

1. A laser guided ultrasonic inspection apparatus, said apparatus comprising:
   an underwater robot for independently moving along a path on an inner wall of a reactor vessel; and
   a laser pointer having a laser beam source thereupon, said laser pointer being multi-directionally tiltable from a fixed position relative to an interior of the reactor vessel,
   wherein said laser pointer guides said underwater robot along the path.

2. A laser guided ultrasonic inspection apparatus as recited in claim 1, wherein said robot comprises magnetic wheels for magnetically adhering said robot to said inner wall of the reactor vessel.

3. A laser guided ultrasonic inspection apparatus as recited in claim 1, wherein said robot further comprises a position sensitive detector thereupon, said position sensitive detector being configured to be irradiated by said laser beam source on said laser pointer.

4. A laser guided ultrasonic inspection apparatus as recited in claim 3, wherein said robot includes at least one motor for moving said robot in a direction which maintains a laser light beam from said laser beam source at a predetermined position on a surface of the position sensitive detector, wherein said robot follows the laser light beam.

5. A laser guided ultrasonic inspection apparatus as recited in claim 1, said underwater robot further comprising positioning means for stably positioning said underwater robot on the inner wall of the reactor vessel.

6. A laser guided ultrasonic inspection apparatus as recited in claim 5, wherein said positioning means comprises a parallelogram type caster linker for positive positioning of said underwater robot.

7. A laser guided ultrasonic inspection apparatus as recited in claim 6, wherein said underwater robot comprises at least one driven magnetic wheel, and wherein said parallelogram type caster linker comprises at least one magnetic caster wheel, said parallelogram type caster linker being configured to ensure that the at least one driven magnetic wheel and the at least one magnetic caster wheel maintain contact with the inner wall of the reactor vessel.

8. A laser guided ultrasonic inspection apparatus as recited in claim 1, further comprising feedback means for providing positional feedback on said underwater robot to said laser pointer, said positional feedback being used in a control algorithm for determining further movement of the underwater robot.

9. A laser guided ultrasonic inspection apparatus as recited in claim 1, further comprising control means for controlling a position of said underwater robot by controlling a moving direction of said laser pointer, said control means receiving positional information from at least one sensor on said robot, and based upon commands from a computing device.

10. A laser guided ultrasonic inspection apparatus as recited in claim 9, wherein said robot further includes inclinometer means providing inclinometer data to said control means.

11. A laser guided ultrasonic inspection apparatus as recited in claim 9, wherein said robot further includes depth sensor means coupled to said control means for detecting a depth of said robot.

12. A laser guided ultrasonic inspection apparatus as recited in claim 10, wherein said robot further includes position sensor means coupled to said control means for providing positional information on said robot.

13. A method for controlling a laser guided inspection apparatus, said method comprising the steps of:

providing an underwater robot for independently moving along a path on an inner wall of a reactor vessel;

providing a laser pointer having a laser beam thereupon and being multi-directionally tiltable from a fixed position relative to an interior of the reactor vessel, said underwater robot being configured to follow a path determined by the laser pointer;

controlling the underwater robot by moving the laser pointer along a path, said path being determined by:

$$v_l = v_c + \dot{\phi}L$$
$$= K_{py}e_y + K_{dy}\dot{e}_y + K_{px}e_x + K_{dx}\dot{e}_x$$
$$v_r = v_c + \dot{\phi}L$$
$$= K_{py}e_y + K_{dy}\dot{e}_y - K_{px}e_x - K_{dx}\dot{e}_x$$

where, $v_l$, $v_r$:left/right wheel velocity, $v_c$, $\dot{\phi}$:linear and angular velocity of a robot center, $e_x$, $e_y$:position error to the direction of x, y axes, $K_{py}$, $K_{dy}$, $K_{px}$, $K_{dx}$:the gain of a corresponding controller.

* * * * *

UNITED STATES PATENT AND TRADEMARK OFFICE
CERTIFICATE OF CORRECTION

PATENT NO. : 5,809,099

DATED : September 15, 1998

INVENTOR(S) : Kim et al.

It is certified that error appears in the above-identified patent and that said Letters Patent is hereby corrected as shown below:   On the title page:

Item [75], line 3, after "You-Rark Choi" insert therefor

-- Chang-Kue Park --

Signed and Sealed this

Fifth Day of January, 1999

Attest:

Attesting Officer

Acting Commissioner of Patents and Trademarks